(12) United States Patent
Maeda

(10) Patent No.: US 6,352,326 B1
(45) Date of Patent: Mar. 5, 2002

(54) PRINTING APPARATUS AND PRINTING METHOD

(75) Inventor: Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/640,588

(22) Filed: Aug. 18, 2000

(30) Foreign Application Priority Data

Aug. 24, 1999 (JP) ............................................ 11-236278

(51) Int. Cl.[7] .............................................. B41J 29/38
(52) U.S. Cl. .......................................... 347/12; 347/16
(58) Field of Search ............................. 347/12, 16, 19; 399/16; 358/1.17, 524

(56) References Cited

U.S. PATENT DOCUMENTS

| 5,539,445 A | * | 7/1996 | Muramatsu et al. | ........ 347/262 |
| 5,790,143 A | * | 8/1998 | Takada et al. | ................. 347/16 |

FOREIGN PATENT DOCUMENTS

JP        07-47740      2/1995      ............ B41J/19/96

\* cited by examiner

*Primary Examiner*—Thinh Nguyen
(74) *Attorney, Agent, or Firm*—Fitzpatrick, Cella, Harper & Scinto

(57) ABSTRACT

A printing apparatus and a printing method are provided which keep the printing within a printable area and correctly complete the multi-pass printing even when a rear end part of the printing medium is printed in the multi-pass printing. When the multi-pass printing is performed by using a printing head which has a plurality of printing element blocks each measuring h in length and by feeding the printing medium a feed pitch of X at a time, a distance to the rear end of the printing medium, i.e., remaining feedable distance Y is calculated. If the remaining feedable distance Y is equal to or larger than X, the printing medium is fed the feed pitch X, the first shift register increases the number of rotations by X/h for each block and rotates the image data accordingly. This rotated image data is thinned before being printed. When the remaining feedable distance Y is less than the feed pitch X, the printing medium is fed by a maximum multiple X' of h that does not exceed the remaining feedable distance Y, the first shift register increases the number of rotations by X/h and rotates the image data accordingly, and the second shift register increases the number of rotations by (X–X')/h and rotates the image data accordingly. The image data thus processed is then printed.

10 Claims, 17 Drawing Sheets

PRINTING APPARATUS AND PRINTING METHOD

This application is based on Japanese Patent Application No. 11-236278 (1999) filed Aug. 24, 1999, the contents of which are incorporated hereinto by reference.

BACKGROUND OF THE INVENTION

1. Field of the Invention

The present invention relates to a serial type printing apparatus (also referred to as a "printer") and a printing method using this printing apparatus. More specifically, the present invention relates to a printing apparatus and a printing method which uses a multi-pass printing mode in which a printing head scans a same area of a printing medium a plurality of times to complete the printing.

In addition to general printing apparatus, the present invention can be applied to copying machines, facsimiles with a communication system and word processors with a printing unit and also to industrial printing apparatus combined with a variety of processing devices.

2. Description of the Related Art

As information devices such as computers become more widespread, the printing apparatus such as printers are also finding an increasing range of applications. Of these, a so-called serial type printing apparatus, in which the printing head being arranged a plurality of printing elements is scanned over the printing medium to perform the printing, is coming into rapidly increasing use because of its compact size and low cost.

Some such serial type printing apparatus have a multi-pass printing mode that prints an image with a higher quality than a normal mode provides. The printing in this multi-pass printing mode is carried out as follows. The printing head is scanned over the printing medium in a direction perpendicular to the arrangement direction of the printing elements and, after this one scan, the paper is fed in the arrangement direction of the printing element by a distance shorter than the height of the printing head. This sequence of operations is repeated. The printing head scans the same printing area of the printing medium a plurality of times to complete the printing. Suppose, for example, the height of the printing head is H and the distance that the paper is fed once is x, the printing head completes the printing on the same area of the printing medium by performing the scan operation (H/x) times.

In such a multi-pass printing mode, the printing elements in the printing head are grouped into several blocks in the order of arrangement, each having a length equal to the distance x of once paper feeding. In a first scan the image data of a predetermined area on the printing medium are printed by a first block of the printing elements. In a second scan after the paper has been fed a distance of x, the same image data are printed by a second block of the printing elements. Hence, in this multi-pass printing mode, many printing apparatus adopt a construction in which the image data read out from an image data storage means can be rotated or shifted one block length x at a time to any desired location of the printing head for printing, without moving the image data itself which are stored in the image data storage means. The term "rotate" means shifting data a predetermined unit at a time. Because the same area of the printing medium is scanned by the printing head a plurality of times to complete an image, it is often the case that data thinning processing is performed to print the image data with a plurality of complementary scans by the printing head. In this way, a means is provided to perform a predetermined thinning operation on the rotated or shifted image data.

If the printing head performs printing in an area covering or beyond the rear end of the printing medium, ink may adhere to other than the printing medium, for example, platen. To solve this problem, as disclosed in Japanese Patent Application Laid-Open No. 7-47740 (1995), the printing medium is not fed beyond the printable area when the printing is performed at the rear end. Instead, the data to be printed is shifted toward the upstream side with respect to the printing medium feed direction so that the printing can perform to the full extent of the scannable area.

When the multi-pass printing is performed at the rear end part of the printing medium, however, it is necessary to simultaneously perform a data rotation for the multi-pass printing and a data rotation for correction during the rear end printing. In conventional apparatus there is only one means for rotating or shifting the image data, so the amount of rotation for the one rotation means must be determined by considering both a rotation amount for the multi-pass printing and a rotation amount for the rear end correction.

When the rear end of the printing medium is to be printed by the multi-pass printing, the data to be printed needs to be corrected by shifting it toward the upstream side of the printing medium while at the same time thinning the data for each pass. The conventional apparatus, however, is provided with a data thinning means that performs a data thinning operation on the rotated data output from a rotating means. Hence, when the rear end portion of the printing medium is to be printed by the multi-pass printing, not only the rotation of the image data by one rotating means must be controlled, but the data thinning pattern itself must be separately shifted on the buffer which stores the data thinning pattern, in order to correctly complete the multi-pass printing.

SUMMARY OF THE INVENTION

The object of the present invention is to provide a printing apparatus and a printing method that perform printing within a printable area and complete the multi-pass printing correctly even when the rear part of the printing medium is printed by the multi-pass printing.

In a first aspect of the present invention, there is provided a printing apparatus for forming an image on an entire surface of a printing medium by scanning a printing head being arranged a plurality of printing elements over the printing medium a plurality of times in a direction different from that in which the printing elements are arranged and by moving, between the plurality of scans, the printing medium relative to the printing head in a direction different from that in which the printing head is scanned, the printing apparatus comprising:

a printing medium feeding unit for moving the printing medium a predetermined feed distance relative to the printing head;

a data storing unit for storing image data for one scan of the printing head;

a first rotating unit for reading out the image data stored in the data storing unit and rotating the image data a predetermined number of times, one block of data at a time, the one block representing a predetermined amount of data;

a thinning unit for thinning the image data output from the first rotating unit with a predetermined pattern; and a second rotating unit for reading out the image data thinned by the thinning unit and rotating the image data a predetermined number of times, one block of data at a time, the one block representing a predetermined amount of data.

In a second aspect of the present invention, there is provided a printing method using a printing apparatus, wherein the printing apparatus forms an image on an entire surface of a printing medium by scanning a printing head being arranged a plurality of printing elements over the printing medium a plurality of times in a direction different from that in which the printing elements are arranged and by moving, between the plurality of scans, the printing medium relative to the printing head in a direction different from that in which the printing head is scanned, the printing method comprising:

a printing medium feeding step for moving the printing medium a predetermined feed distance relative to the printing head;

a data storing step for storing image data for one scan of the printing head;

a first rotating step for reading out the image data stored in the data storing step and rotating the image data a predetermined number of times, one block of data at a time, the one block representing a predetermined amount of data;

a thinning step for thinning the image data output from the first rotating step with a predetermined pattern; and a second rotating step for reading out the image data thinned in the thinning step and rotating the image data a predetermined number of times, one block of data at a time, the one block representing a predetermined amount of data.

With the above construction, of the two rotating means, one is used as the data rotating means for the multi-pass printing and the other as the data rotating means for the printing correction at the rear end part of the printing medium. So, this allows these processing to be performed by separate algorithms. And the amounts of rotation can be calculated separately.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Before going into detail, it should be noted that the term "print" (or "record") means forming an image, design or pattern on print media in general or processing the print media, whether what is printed on the media is significant information, such as characters and figures, or whether it is visually perceptible.

The term "printing medium" (or "printing sheet") refers to not only paper used in general printing apparatus but also any ink receiving materials such as cloth, plastic film, metal plate, glass, ceramics, wood and leather. The term "ink" (or "liquid") should be interpreted broadly as in the definition of the term "print". That is, the ink refers to any liquid that can be applied to the printing medium to form images, designs and patterns, process the printing medium, or process ink (e.g., solidifying or insolubilizing colorants in the ink applied to the printing medium).

Embodiments of the printing apparatus according to the present invention will be described by referring to the accompanying drawings.

In the following description we take up as an example a printing apparatus using an ink jet printing system.

1. APPARATUS BODY

Figure 1:
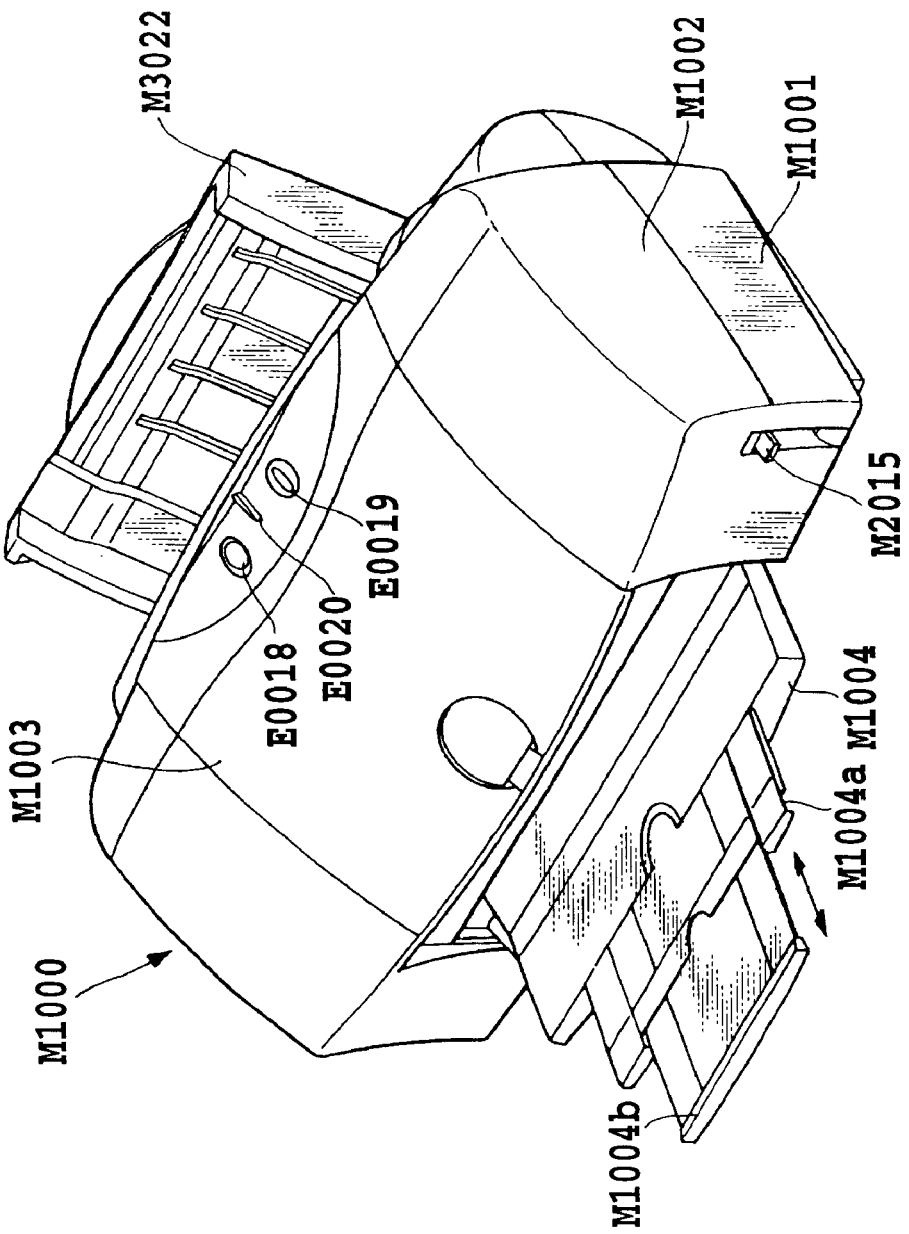
FIG. 1 is a perspective view showing an external construction of an ink jet printer as one embodiment of the present invention.
Figure 2:
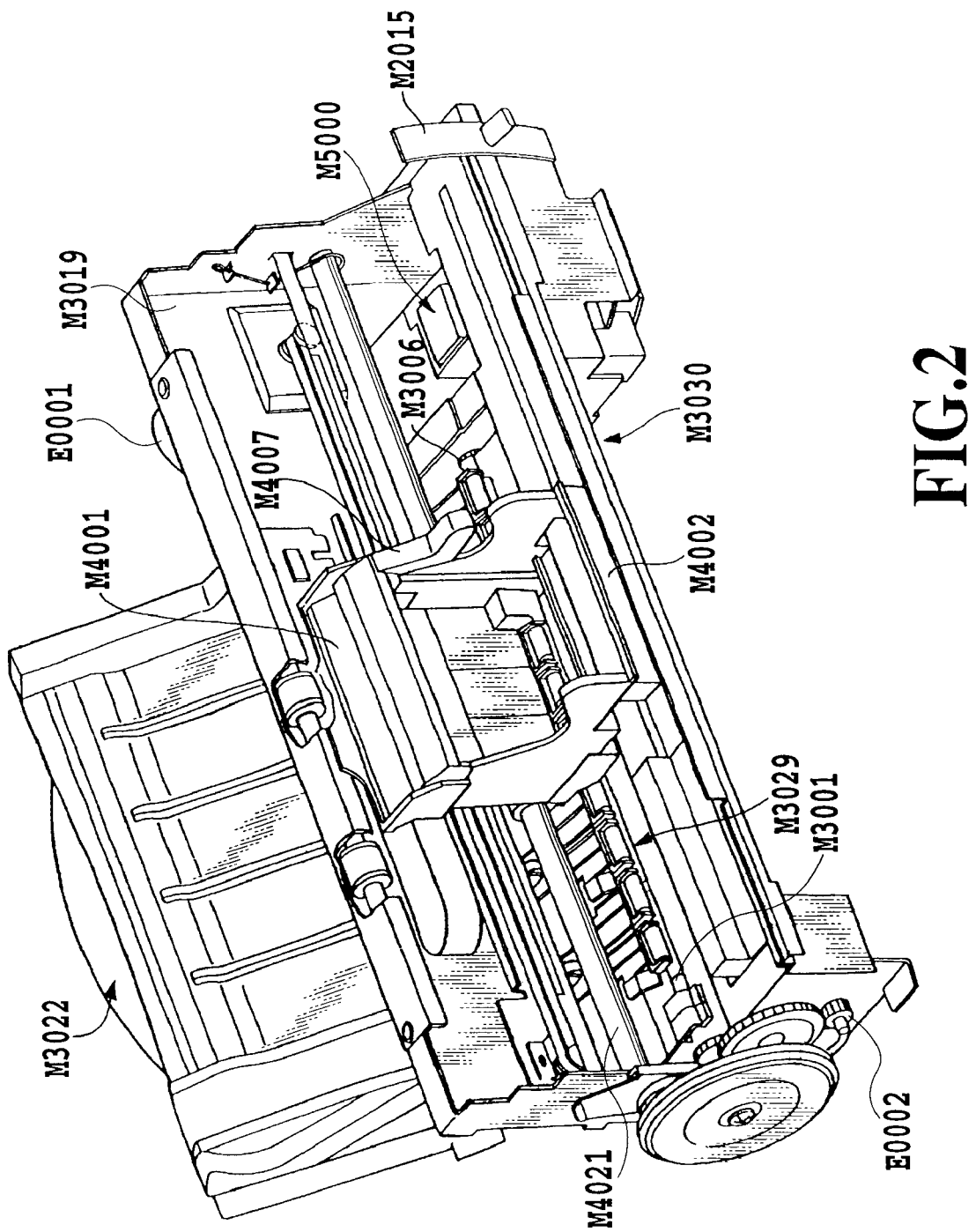
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chassis M3019 is made of a plurality of plate-like metal members with a predetermined rigidity to form a skeleton of the printing apparatus and holds various printing operation mechanisms described later.

The lower case M1001 forms roughly a lower half of the housing of the printer body M1000 and the upper case M1002 forms roughly an upper half of the printer body M1000. These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001. When the print operation is to be performed, the discharge tray M1004 is rotated forwardly to open the opening so that printed sheets can be discharged and successively stacked. The discharge tray M1004 accommodates two auxiliary trays M1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such as alerting the operator to printer troubles as by changing its blinking intervals and color. Further, a buzzer E0021 (FIG. 7) may be sounded. When the trouble is eliminated, the resume key E0019 is pressed to resume the printing.

2. PRINTING OPERATION MECHANISM

Next, a printing operation mechanism installed and held in the printer body M1000 according to this embodiment will be explained.

The printing operation mechanism in this embodiment comprises: an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit to perform a desired printing on the print sheet carried to the print position; and an ejection performance recovery unit M5000 to recover the ink ejection performance of the print unit.

Here, the print unit will be described. The print unit comprises a carriage M4001 movably supported on a carriage shaft M4021 and a print head cartridge H1000 removably mounted on the carriage M4001.

2.1 Print Head Cartridge

Figure 3:
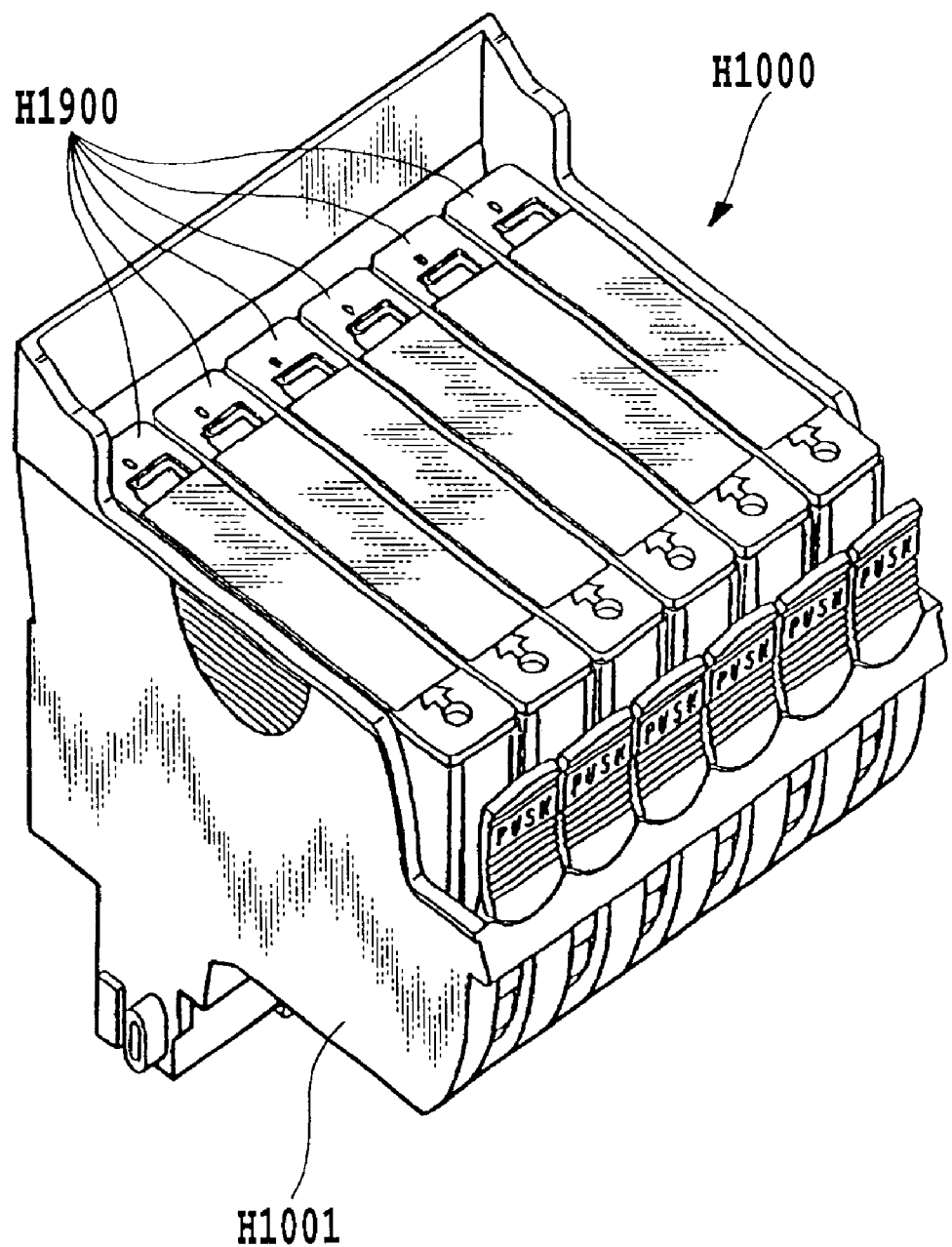
FIG. 3 is a perspective view showing an assembled print head cartridge used in the printer of one embodiment of the present invention.

First, the print head cartridge used in the print unit will be described with reference to FIGS. 3 to 5. The print head cartridge H1000 in this embodiment, as shown in FIG. 3, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as photograph.

Figure 4:
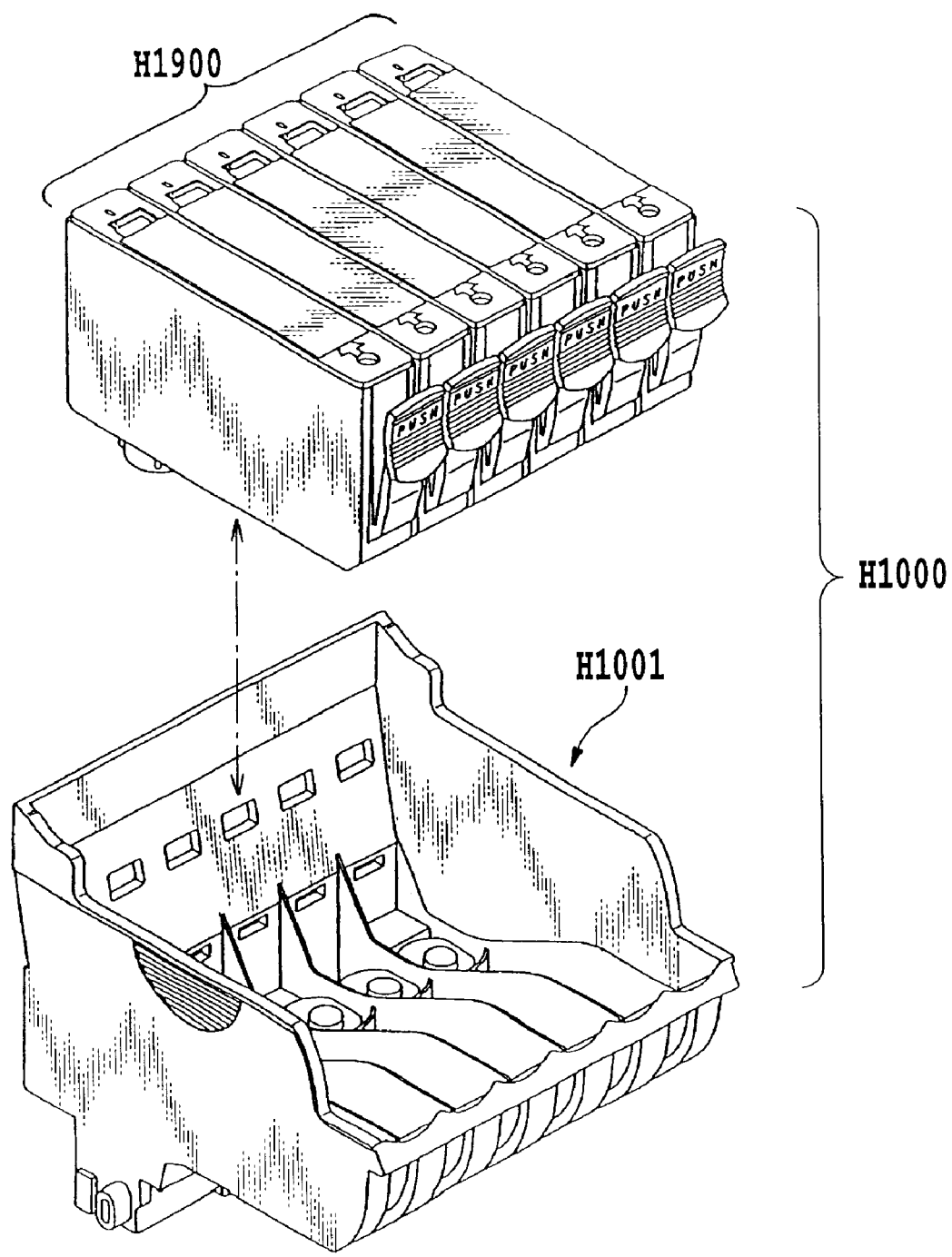
FIG. 4 is an exploded perspective view showing the print head cartridge of FIG. 3.

As shown in FIG. 4, these individual ink tanks are removably mounted to the print head H1001.

Figure 5:
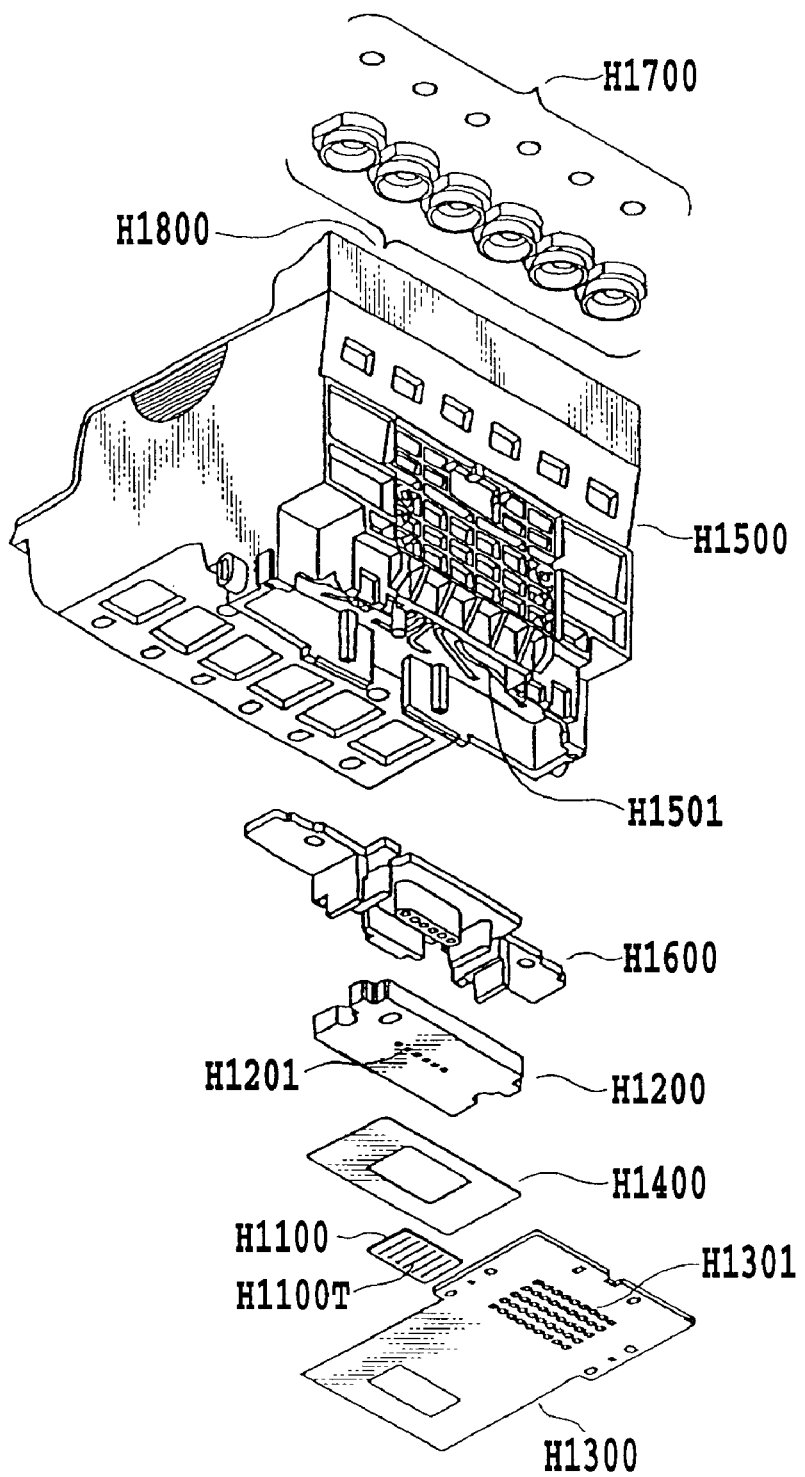
FIG. 5 is an exploded perspective view of the print head of FIG. 4 as seen diagonally below.

Then, the print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink and electric wires, such as aluminum, for supplying electricity to individual print elements. A plurality of ink passages and a plurality of nozzles H1100T, both corresponding to the print elements, are also formed by the photolithography technology. In the back of the print element substrate H1100, there are formed ink supply ports for supplying ink to the plurality of ink passages. The print element substrate H1100 is securely bonded to the first plate H1200 which is formed with ink supply ports H1201 for supplying ink to the print element substrate H1100. The first plate H1200 is securely bonded with the second plate H1400 having an opening. The second plate H1400 holds the electric wiring board H1300 to electrically connect the electric wiring board H1300 with the print element substrate H1100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals H1301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank side end of the ink passage H1501 that engages with the ink tank H1900, a filter H1700 is provided to prevent external dust from entering. A seal rubber H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the seal rubber H1800, and the print element unit, which includes the print element substrate H1100, the first plate H1200, the electric wiring board H1300 and the second plate H1400, are combined as by adhesives to form the print head H1001.

2.2 Carriage

Next, by referring to FIG. 2, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to set the print head H1001 at a predetermined mounting position.

That is, the head set lever M4007 is provided at the upper part of the carriage M4001 so as to be pivotable about a head set lever shaft. There is a spring-loaded head set plate (not shown) at an engagement portion where the carriage M4001 engages the print head H1001. With the spring force, the head set lever M4007 presses against the print head H1001 to mount it on the carriage M4001.

At another engagement portion of the carriage M4001 with the print head H1001, there is provided a contact flexible printed cable (see FIG. 7: simply referred to as a contact FPC hereinafter) E0011 whose contact portion electrically contacts a contact portion (external signal input terminals) H1301 provided in the print head H1001 to transfer various information for printing and supply electricity to the print head H1001.

Between the contract portion of the contact FPC E0011 and the carriage M4001 there is an elastic member not shown, such as rubber. The elastic force of the elastic member and the pressing force of the head set lever spring combine to ensure a reliable contact between the contact portion of the contact FPC E0011 and the carriage M4001. Further, the contact FPC E0011 is connected to a carriage substrate E0013 mounted at the back of the carriage M4001 (see FIG. 7).

3. SCANNER

The printer of this embodiment can mount a scanner in the carriage M4001 in place of the print head cartridge H1000 and be used as a reading device.

The scanner moves together with the carriage M4001 in the main scan direction, and reads an image on a document fed instead of the printing medium as the scanner moves in the main scan direction. Alternating the scanner reading operation in the main scan direction and the document feed in the subscan direction enables one page of document image information to be read.

Figure 6:
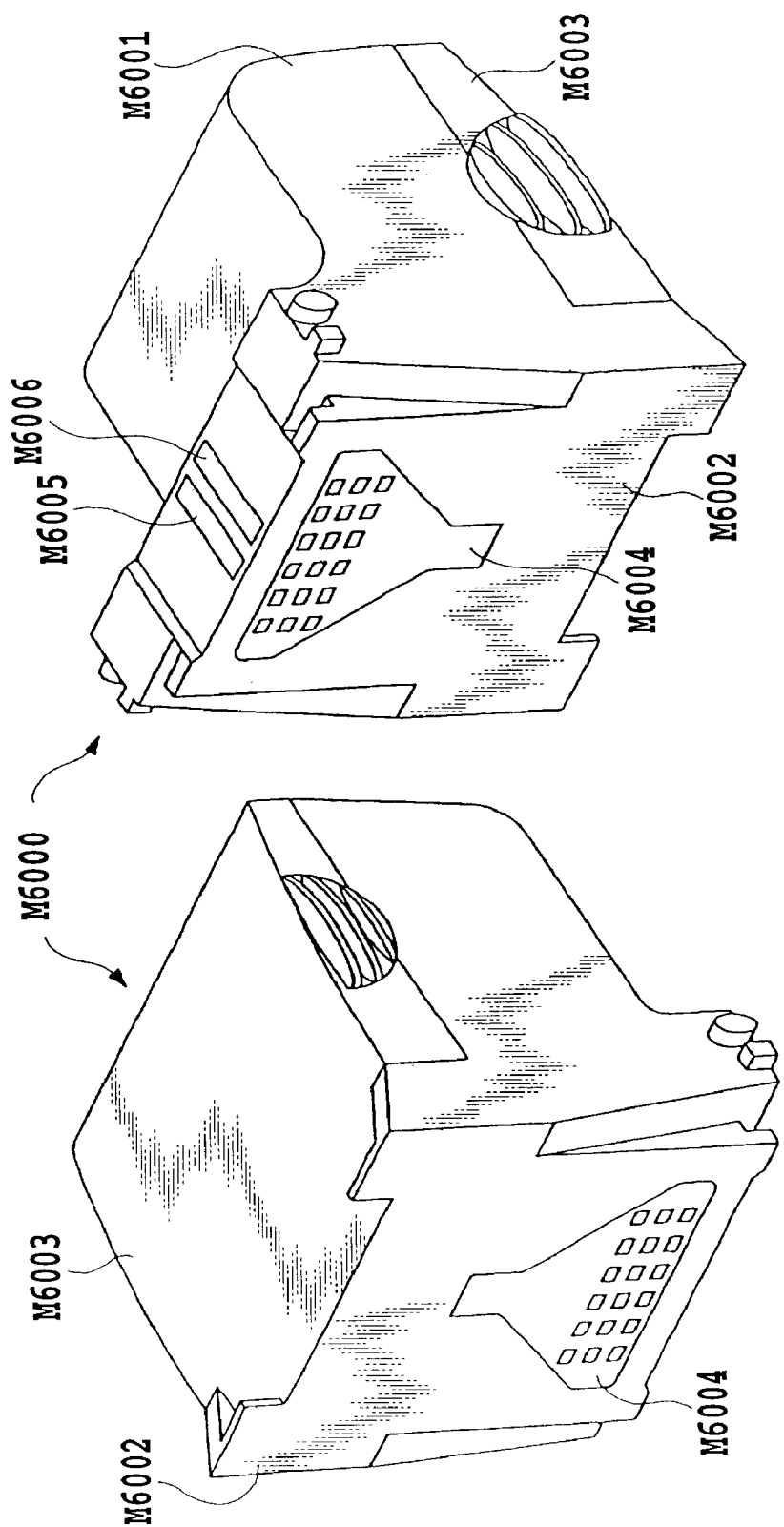
FIGS. 6A and 6B are perspective views showing a construction of a scanner cartridge upside down which can be mounted in the printer of one embodiment of the present invention instead of the print head cartridge of FIG. 3.

FIGS. 6A and 6B show the scanner M6000 upside down to explain about its outline construction.

As shown in the figure, a scanner holder M6001 is shaped like a box and contains an optical system and a processing circuit necessary for reading. A reading lens M6006 is provided at a portion that faces the surface of a document when the scanner M6000 is mounted on the carriage M4001. The lens M6006 focuses light reflected from the document surface onto a reading unit inside the scanner to read the document image. An illumination lens M6005 has a light source not shown inside the scanner. The light emitted from the light source is radiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the scanner M6000 is mounted on the carriage M4001, the scanner contact PCB M6004 contacts the contact FPC E0011 of the carriage M4001 to electrically connect the substrate to a control system on the printer body side through the carriage M4001.

4. Example Configuration of Printer Electric Circuit

Next, an electric circuit configuration in this embodiment of the invention will be explained.

Figure 7:
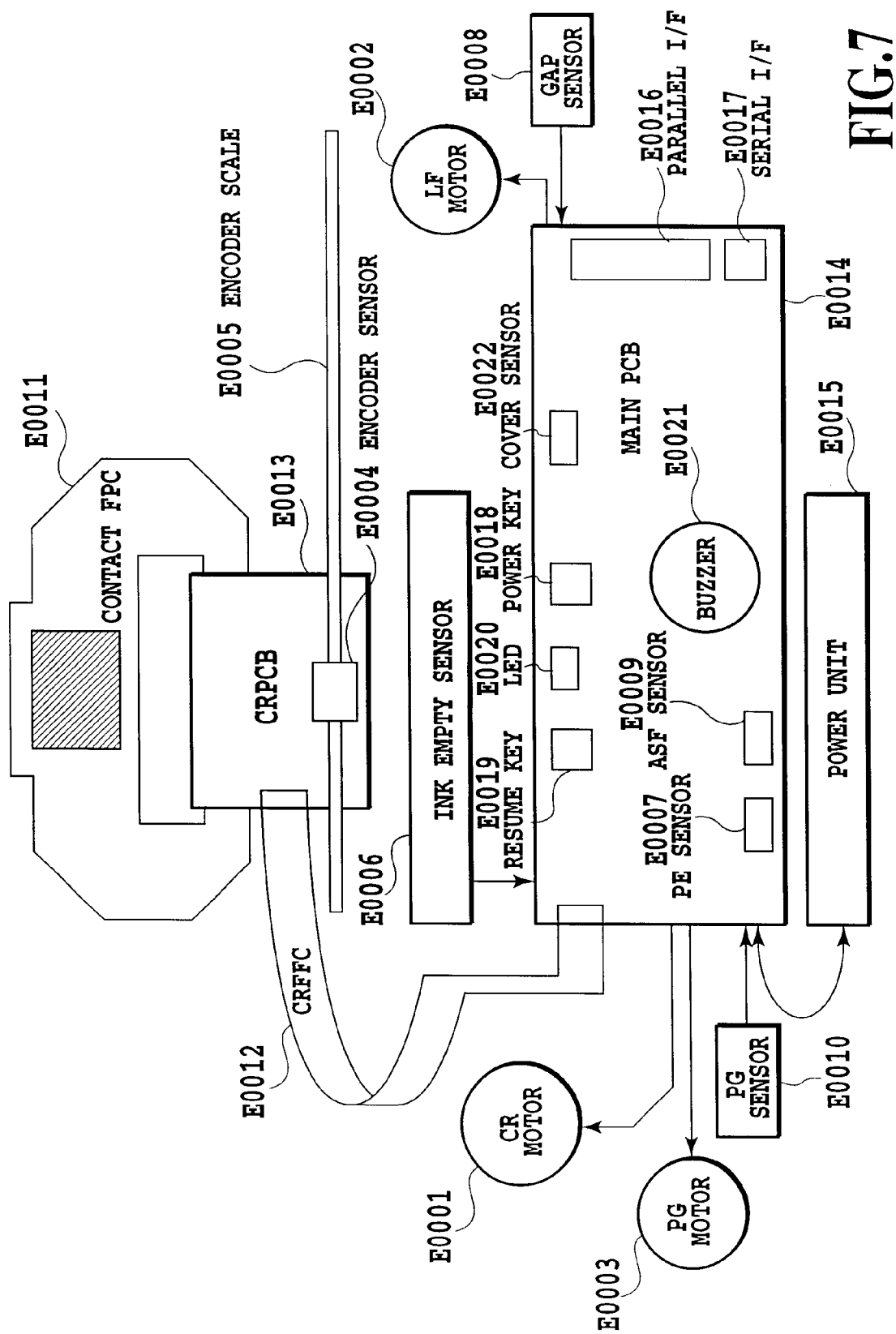
FIG. 7 is a block diagram schematically showing the overall configuration of an electric circuitry of the printer according to one embodiment of the present invention.

FIG. 7 schematically shows the overall configuration of the electric circuit in this embodiment.

The electric circuit in this embodiment comprises mainly a carriage substrate (CRPCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 as the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCB E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F) E0017, a resume key E0019, an LED E0020, a power key E0018 and a buzzer E0021. The main PCB E0014 is connected to and controls a motor (CR motor) E0001 that constitutes a drive source for moving the carriage M4001 in the main scan direction; a motor (LF motor) E0002 that constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E000B, a PG sensor E0010, the CRFFC E0012 and the power supply unit E0015.

Figures 8, 8A:
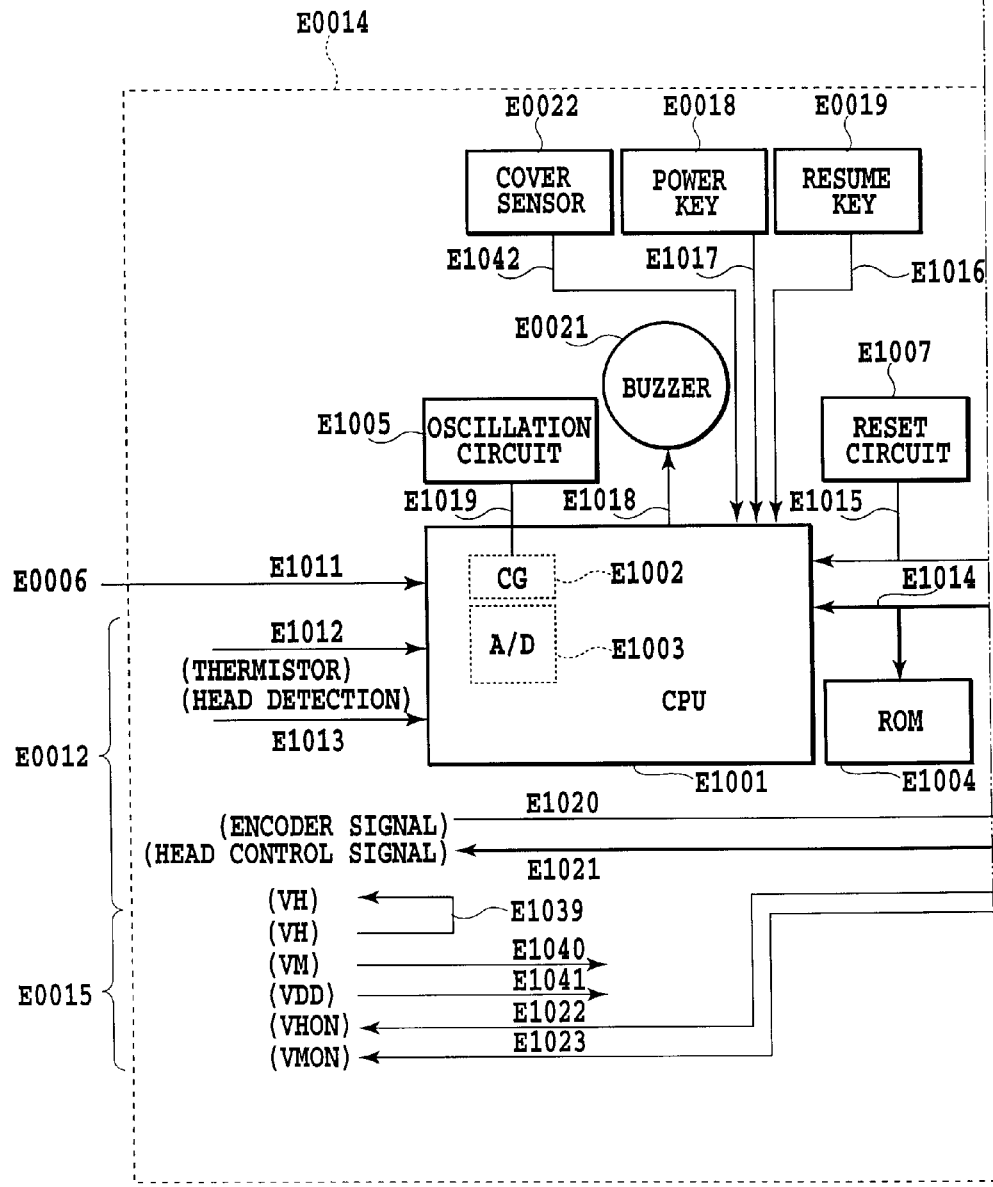
FIG. 8 is a diagram showing the relation between FIGS. 8A and 8B, FIGS. 8A and 8B being block diagrams representing an example inner configuration of a main printed circuit board (PCB) in the electric circuitry of FIG. 7.
Figure 8B:
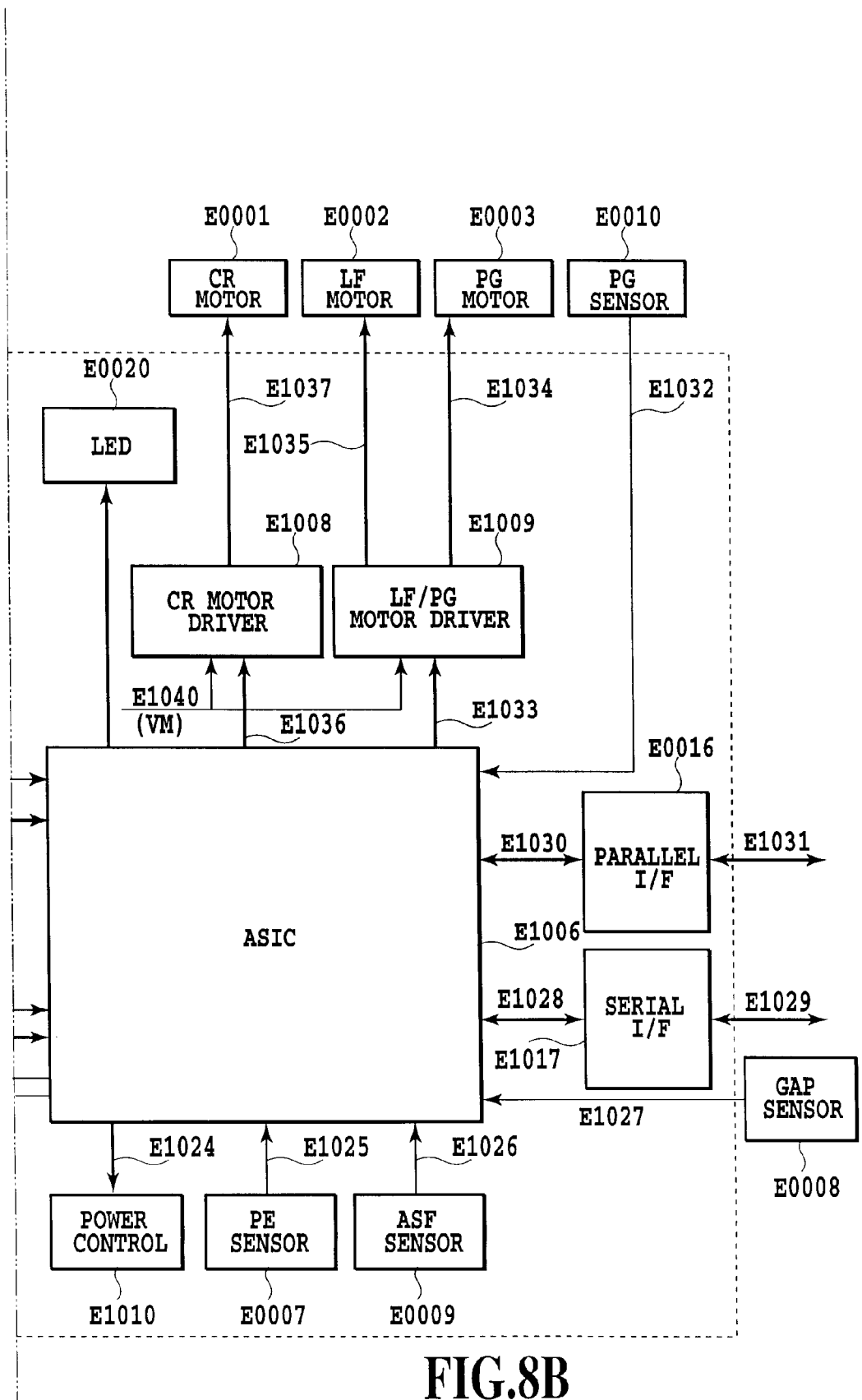

FIG. 8 is a diagram showing the relation between FIGS. 8A and 8B, and FIGS. 8A and 8B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus E1014. According to a program stored in the ROM E1004, the CPU E1001 controls the ASIC E1006, checks the status of an input signal E1017 from the power key, an input signal E1016 from the resume key, a cover detection signal E1042 and a head detection signal (HSENS) E1013, drives the buzzer E0021 according to a buzzer signal (BUZ) E1018, and checks the status of an ink empty detection signal (INKS) E1011 connected to a built-in A/D converter E1003 and of a temperature detection signal (TH) E1012 from a thermistor. The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

E1010 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E1006. The serial I/F E0017 transfers a serial I/F signal E1028 from the ASIC E1006 to a serial I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by the main PCB E0014 and then sent out to the flexible flat cable E0011 to be used for driving the print head cartridge H1000. E1007 denotes a reset circuit which detects a reduction in the logic power signal E1041 and sends a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition, the ASIC E1006 detects the status of a PE detection signal (PES) E1025 from the PE sensor E0007, an ASF detection signal (ASFS) E1026 from the ASF sensor E0009, a gap detection signal (GAPS) E1027 from the GAP sensor E0008 for detecting a gap between the print head and the printing medium, and a PG detection signal (PGS) E1032 from the PE sensor E0007, and sends data representing the statuses of these signals to the CPU E1001 through the control bus E1014. Based on the data received, the CPU E1001 controls the operation of an LED drive signal E1038 to turn on or off the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 9A:
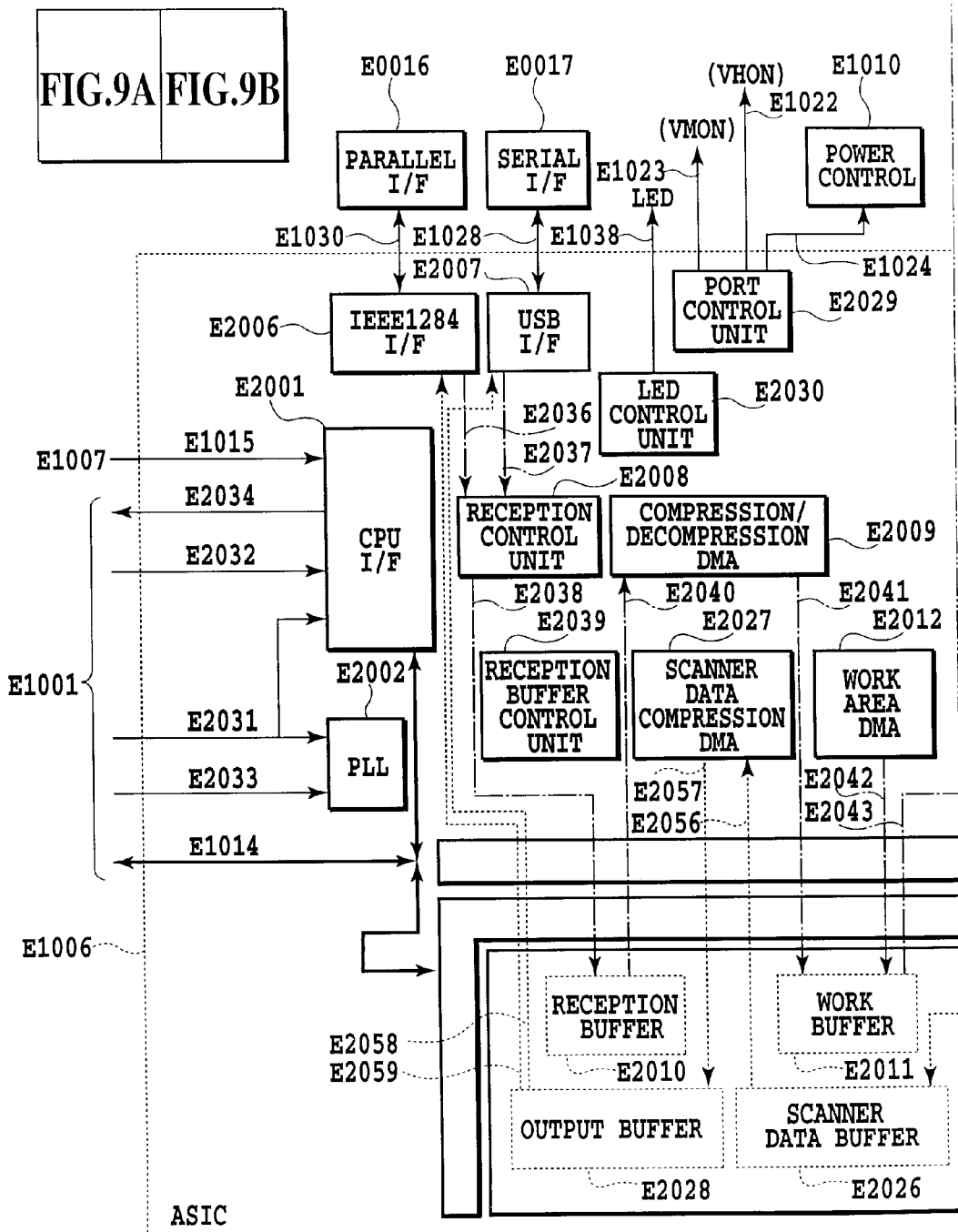
FIG. 9 is a diagram showing the relation between FIGS. 9A and 9B, FIGS. 9A and 9B being block diagrams representing an example inner configuration of an application specific integrated circuit (ASIC) in the main PCB of FIGS. 8A and 8B.
Figure 9B:
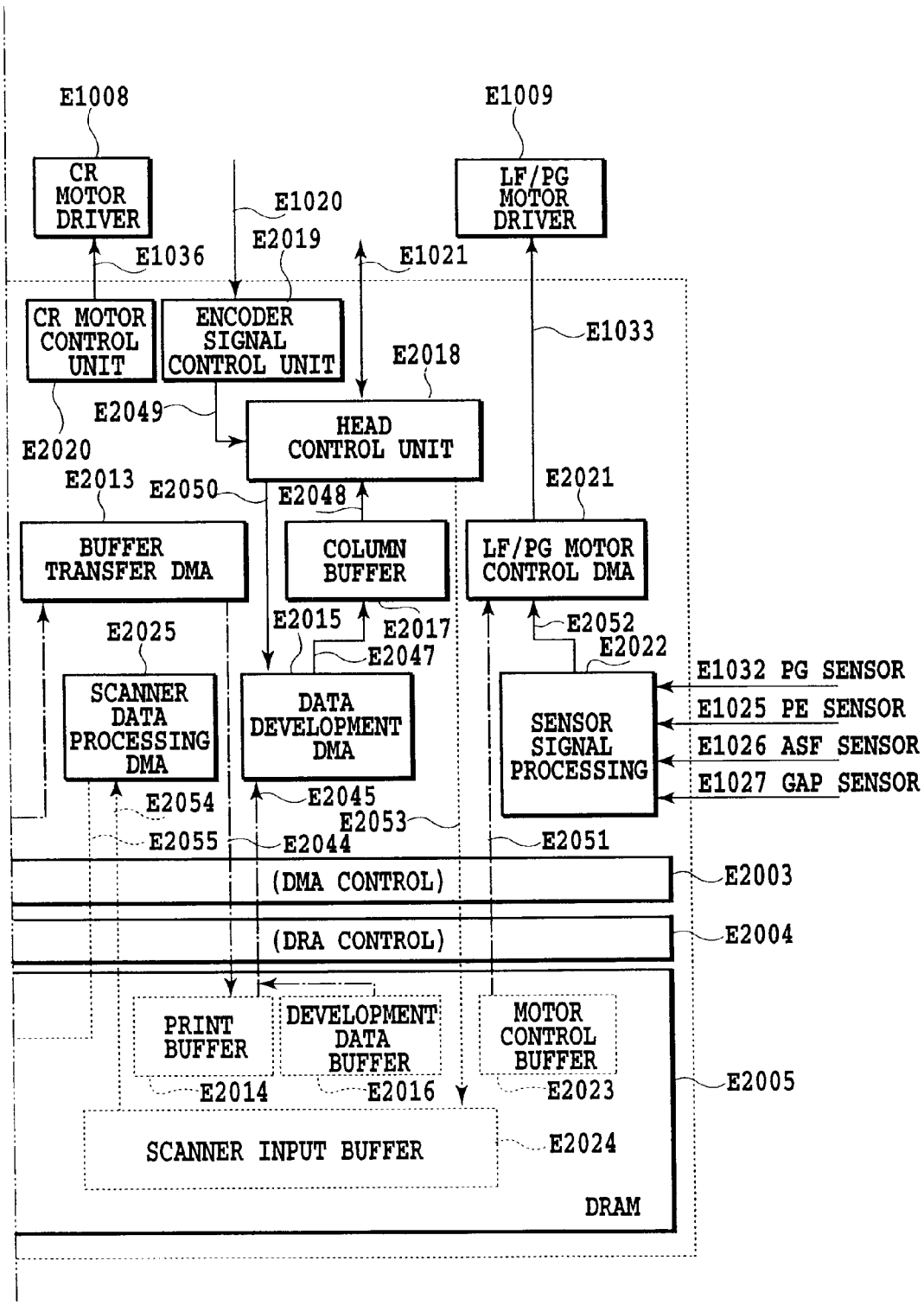

FIG. 9 is a diagram showing the relation between FIGS. 9A and 9B, and FIGS. 9A and 9B are block diagrams showing an example internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001, generates a clock (not shown) to be supplied to the most part of the ASIC E1006.

Denoted E2001 is a CPU interface (CPU I/F) E2001, which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 then outputs an interrupt signal (INT) E2034 to the CPU E1001 to inform it of the occurrence of an interrupt within the ASIC E1006.

E2005 denotes a DRAM which has various areas for storing print data, such as a reception buffer E2010, a work buffer E2011, a print buffer E2014 and a development data buffer E2016. The DRAM E2005 also has a motor control buffer E2023 for motor control and, as buffers used instead of the above print data buffers during the scanner operation mode, a scanner input buffer E2024, a scanner data buffer E2026 and an output buffer E2028.

The DRAM E2005 is also used as a work area by the CPU E1001 for its own operation. Designated E2004 is a DRAM control unit E2004 which performs read/write operations on the DRAM E2005 by switching between the DRAM access from the CPU E1001 through the control bus and the DRAM access from a DMA control unit E2003 described later.

The DMA control unit E2003 accepts request signals (not shown) from various blocks and outputs address signals and control signals (not shown) and, in the case of write operation, write data E2038, E2041, E2044, E2053, E2055, E2057 etc. to the DRAM control unit to make DRAM accesses. In the case of read operation, the DMA control unit E2003 transfers the read data E2040, E2043, E2045, E2051, E2054, E2056, E2058, E2059 from the DRAM control unit E2004 to the requesting blocks.

Denoted E2006 is an IEEE 1284 I/F which functions as a bi-directional communication interface with external host devices, not shown, through the parallel I/F E0016 and is controlled by the CPU E1001 via CPU I/F E2001. During the printing operation, the IEEE 1284 I/F E2006 transfers the receive data (PIF receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2028 in the DRAM E2005 to the parallel I/F E0016 by the DMA processing.

Designated E2007 is a universal serial bus (USB) I/F which offers a bi-directional communication interface with external host devices, not shown, through the serial I/F E0017 and is controlled by the CPU E1001 through the CPU I/F E2001. During the printing operation, the universal serial bus (USB) I/F E2007 transfers received data (USB receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 in the DRAM E2005 to the serial I/F E0017 by the DMA processing. The reception control unit E2008 writes data (WDIF E2038) received from the 1284 I/F E2006 or universal serial bus (USB) I/F E2007, whichever is selected, into a reception buffer write address managed by a reception buffer control unit E2039.

Designated E2009 is a compression/decompression DMA controller which is controlled by the CPU E1001 through the CPU I/F E2001 to read received data (raster data) stored in a reception buffer E2010 from a reception buffer read address managed by the reception buffer control unit E2039, compress or decompress the data (RDWK) E2040 according to a specified mode, and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP) E2044). Reference number E2012 denotes a work area DMA controller which is controlled by the CPU E1001 through the CPU I/F E2001 to repetitively write specified work fill data (WDWF) E2042 into the area of the work buffer whose data transfer by the print buffer transfer DMA controller E2013 has been completed.

Designated E2015 is a print data development DMA controller E2015, which is controlled by the CPU E1001 through the CPU I/F E2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 as the head control signal E1021.

In the scanner reading mode, the head control unit E2018 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2005.

Designated E2027 is a scanner data compression DMA controller which is controlled by the CPU E1001 through the CPU I/F E2001 to read processed data (RDYC) E2056 on the scanner data buffer E2026, perform data compression, and write the compressed data (WDYC) E2057 into the output buffer E2028 for transfer.

Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1001. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers these sensor information to the CPU E1001 according to the mode determined by the CPU E1001. The sensor signal processing unit E2022 also outputs a sensor detection signal E2052 to a DMA controller E2021 for controlling LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1001 through the CPU I/F E2001 to output the head power ON signal E1022, the motor power ON signal E1023 and the power supply control signal E1024.

5. OPERATION OF PRINTER

Figure 10:
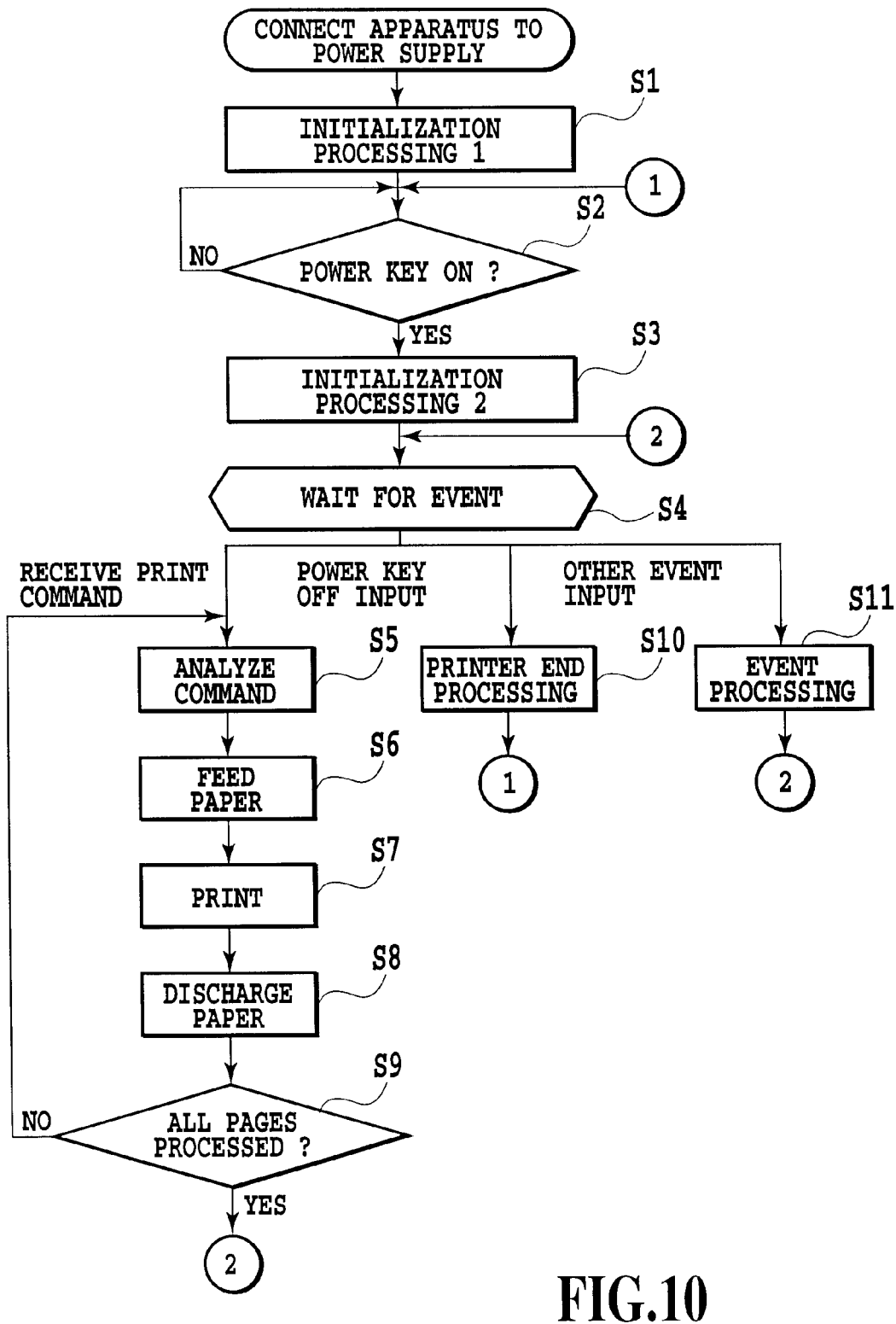
FIG. 10 is a flow chart showing an example of operation of the printer as one embodiment of the present invention.

Next, the operation of the ink jet printing apparatus in this embodiment of the invention with the above configuration will be explained by referring to the flow chart of FIG. 10.

When the printer body M1000 is connected to an AC power supply, a first initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, steps S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and others, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer. Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the sub-scanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004a.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn off various motors and print head, this step renders the apparatus ready to be cut off from power supply and then turns off power, before moving to step S4 waiting for the next event.

Step S11 performs other event processing. For example, this step performs processing corresponding to the ejection performance recovery command from various panel keys or external I/F and the ejection performance recovery event that occurs internally. After the recovery processing is finished, the printer operation moves to step S4 waiting for the next event.

6. FIRST EMBODIMENT

In the printing apparatus of the above construction, this embodiment performs the data processing for multi-pass printing and the printing correction for the rear part of the printing medium by using different algorithms, thereby executing these processing precisely.

Now, the data processing in this embodiment will be explained.

Figure 11:
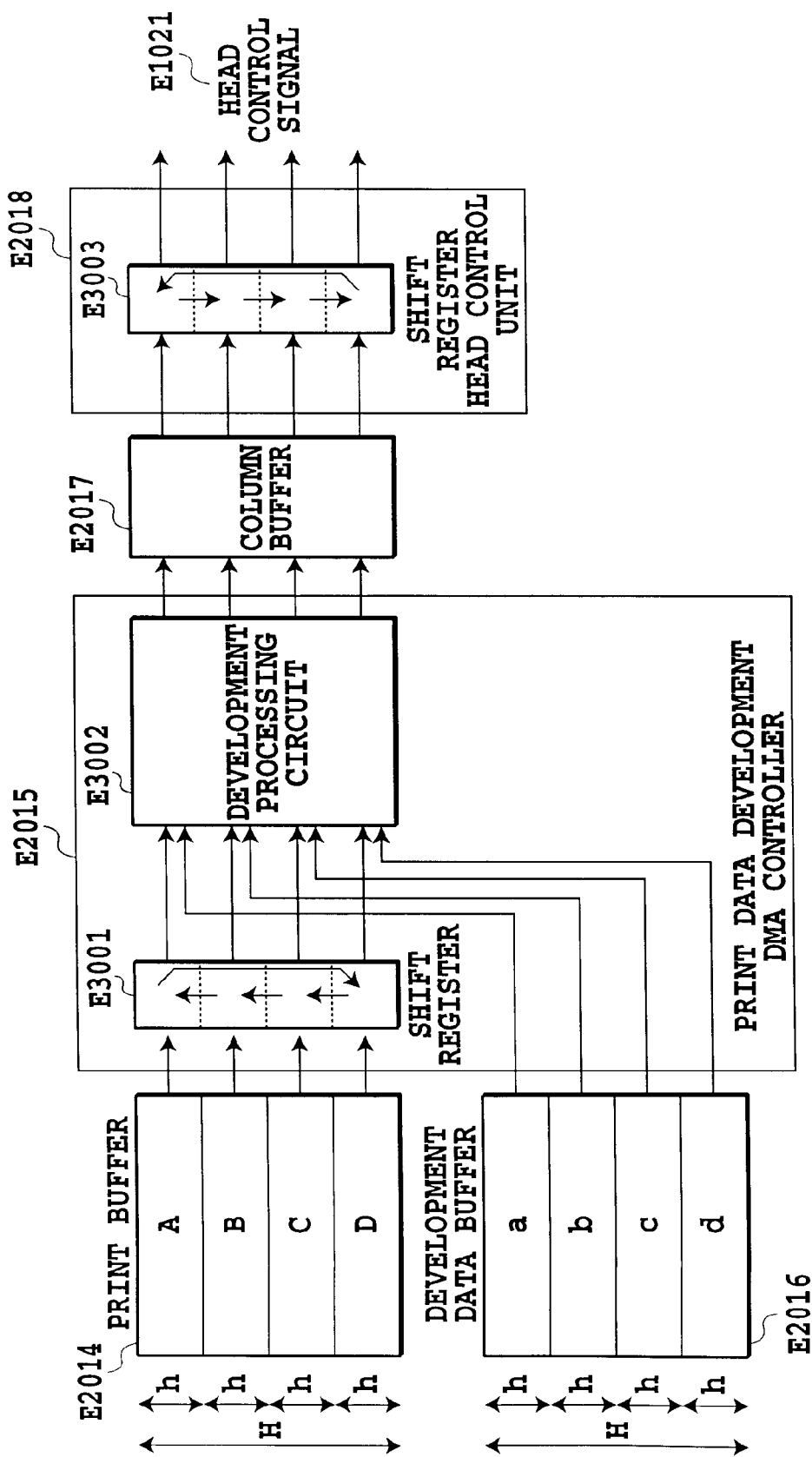
FIG. 11 is a block diagram showing a flow of print data transferred from the print buffer to the printing head.

FIG. 11 is a block diagram showing in detail a flow of print data from the print buffer E2014 to the printing head H1001.

In this embodiment, we will explain about a four-pass printing that forms an image on the same area of the printing medium by four scans.

When an image is formed by four scans, the distance that the printing medium is fed after each scan (referred to as a "paper feed pitch") is H/4 where H is the height of the printing head.

As described above, print data (also referred to as "image data") to be printed by one scan of the printing head is stored in the print buffer E2014. The printing head is divided into four blocks (a, b, c and d) each consisting of several printing elements. The print buffer E2014 is also divided into four blocks (A, B, C and D) corresponding to the four printing element blocks. When the print buffer is divided into four blocks, the height of each blocks is h=H/4.

The print data stored in the print buffer E2014 is read out one column at a time into a print data development DMA controller E2015, with a data development timing signal E2050 from the head control unit E2018 as a trigger. The print data thus read out is rotated a predetermined amount for each block by a first shift register E3001 in the print data development DMA controller E2015. This rotation processing is performed for the multi-pass printing and will be detailed later.

In a development buffer E2016 provided separate from the print buffer E2014, data thinning patterns for the multi-pass printing which are to be ANDed with the print data are stored one for each printing element block. The data thinning patterns or development data stored in the development buffer E2016 are divided in four blocks. These blocks of data are thinning patterns complementary to other blocks of data. That is, these thinning patterns are such that the print data that is thinned by the thinning patterns corresponding to the blocks of the printing head is printed to overlap one another to complete one image.

The development data stored in the development buffer E2016 is also read out one column at a time into the print data development DMA controller E2015 in synchronism with the print data, with the data development timing signal E2050 as a trigger. The data thus read out is entered into a development processing circuit E3002 provided in the print data development DMA controller E2015.

The development processing circuit E3002 also receives the rotated print data, which is then multiplied by the development data for thinning to produce the developed print data.

The developed print data that was subjected to the thinning processing, i.e., development processing, is written into the column buffer E2017. The developed print data written into the column buffer E2017 is read out into the head control unit E2018 and written into a second shift register E3003 provided in the head control unit E2018. Then, the second shift register E3003 similarly rotates the developed print data a predetermined amount for each block. The rotation amounts in the first shift register E3001 and in the second shift register E3003 can be set separately by the CPU E1001.

Figure 12:
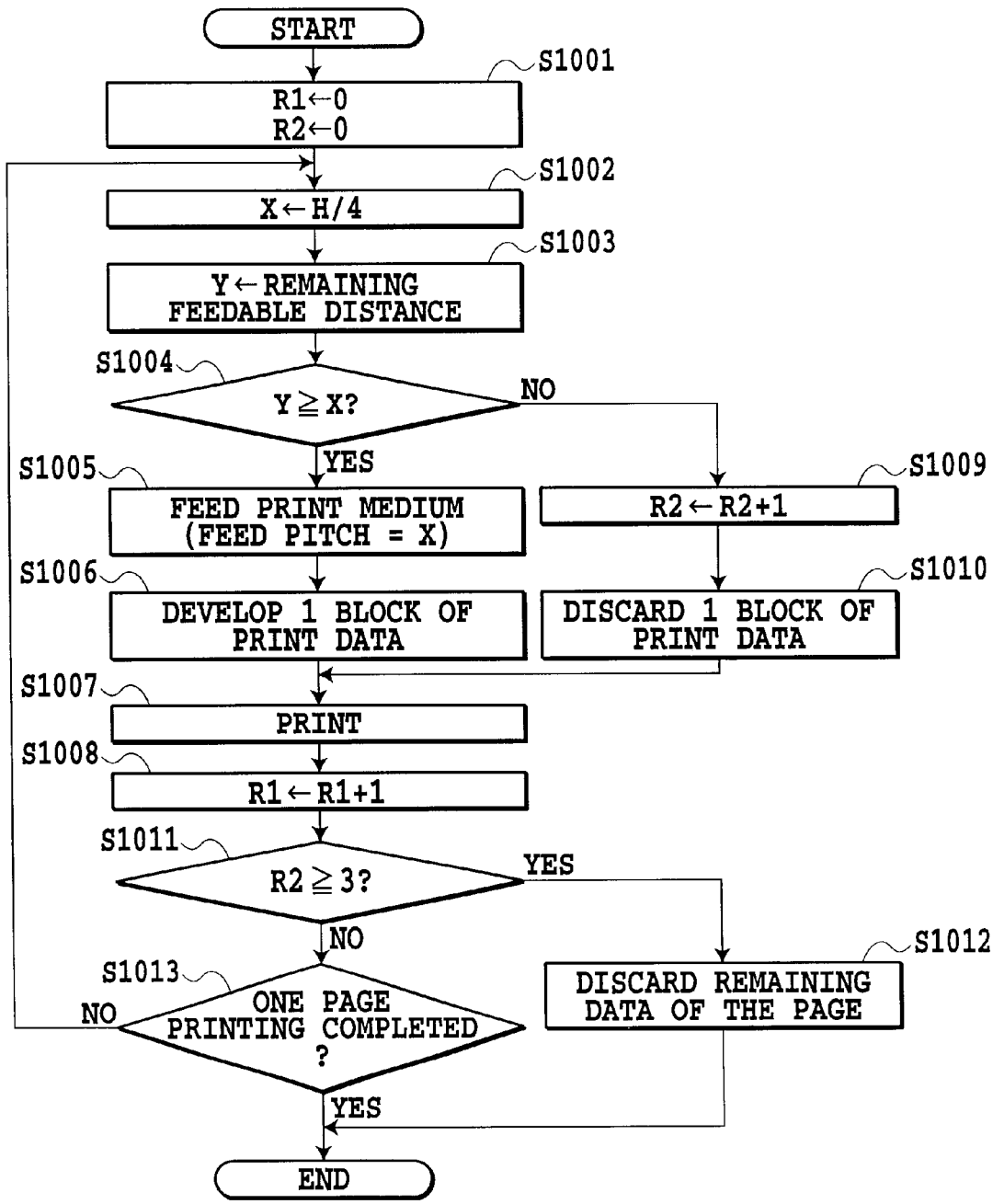
FIG. 12 is a flow chart showing a flow of processing performed by the CPU during the printing operation in the first embodiment.

FIG. 12 is a flow chart showing the processing performed by the CPU E1001.

This processing is executed for each page of the printing medium.

First, CPU E1001 clears to zero a variable R1 representing the rotation amount for the first shift register E3001 and a variable R2 representing the rotation amount for the second shift register E3003 (step S1001).

Because the amount of one paper feed is H/4(=h), H/4 is substituted into a logical printing medium feed pitch X (step S1002). Then, the distance to the rear end of the printable area of the printing medium, i.e., the remaining feedable distance down to the rear end, is determined as Y and this value is substituted into Y (step S1003).

Before starting the printing operation, the distance Y to the rear end of the printable area and the logical printing medium feed pitch X are compared (step S1004). If Y is equal to or greater than X, the printing head can perform one scan without going beyond the rear end of the printable area and the processing proceeds to step S1005. If on the other hand X is greater, the printing head exceeds the rear end of the printable area in the next scan and the processing moves to step S1009.

When Y is equal to or greater than X, the LF motor E0002 is driven to feed the printing medium by the logical printing medium feed pitch X (step S1005). Then, according to a command received through the external I/F, the print data for one block is developed in the print buffer (step S1006). Then, as explained in the block diagram of FIG. 11, the print data development DMA controller E2015 extracts from the print buffer the print data, which is then rotated a set rotation amount R1 in the first shift register E3001. Next, the rotated print data is inputted the development processing circuit E3002, and is multiplied by the development data stored in the development data buffer E2016 to produce the developed print data. Further, the head control unit E2018 receives the developed print data through the column buffer E2017 and puts it into the second shift register E3003 where it is rotated a set rotation amount R2. According to the rotated print data, the printing head performs the printing operation (step S1007). After the printing is completed, the rotation amount R1 in the first shift register E3001 is incremented for the next scan (step S1008).

When, at step S1004, X is larger than Y, the block corresponding to the lowermost end side of the printing medium is outside the printable area. So, the printing medium is not fed but the rotation amount R2 for the second shift register is incremented (step S1009). Then, the print data for that one block located beyond the printable area is discarded (step S1010) and the processing proceeds to step S1007 where the similar processing is performed. At step S1008 the rotation amount R1 is similarly incremented. When the value of the rotation amount R2 that has been incremented in this manner is 3 or more (step S1011), this means that all the blocks in the print buffer E2014 are beyond the printable area and that the printing operation can no longer be performed. Hence, even when the printing of one page of the print data is still in progress, the remaining print data is discarded (step S1012), ending the printing operation.

If on the other hand the rotation amount R2 at step S1011 is less than 3, when the printing is partway through one page, the CPU returns to step S1002 to repeat a series of steps. When the printing is through one page, the printing operation is ended (step S1013).

Figure 13:
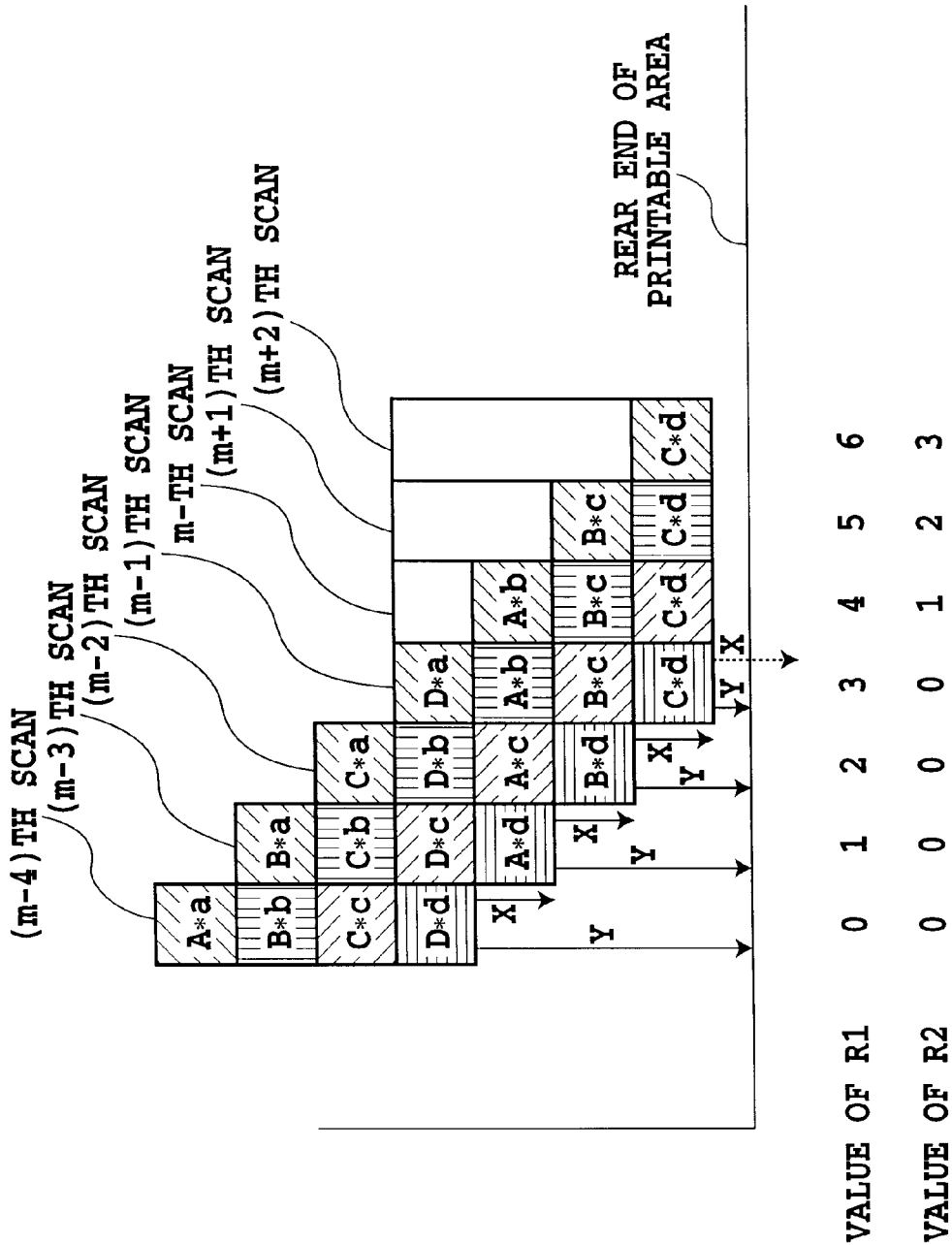
FIG. 13 is a schematic diagram showing how the printing is performed in the first embodiment.

FIG. 13 is a schematic diagram showing how the printing medium is printed.

Each square in the figure represents a block of the printing head and the symbol in the square represents a block of the printing medium A, B, C, D and a block of printing head a, b, c, d that scans the corresponding block of the printing medium. Inclined lines, vertical lines and horizontal lines in the squares represent thinning patterns.

As shown in the figure, up to the (m−1)th scan immediately before the printing head reaches the rear end of the printable area of the printing medium, the remaining feedable distance Y is larger than the logical printing medium feed pitch X, so that the print operation is executed by feeding the printing medium a distance of X at a time and incrementing only the rotation amount R1.

At the m-th and subsequent scans the remaining feedable distance Y is smaller than the logical printing medium feed pitch X. Hence, the printing medium is not fed and the printing operation is performed by incrementing the rotation amount R2 of the second shift register E3003 as well as the rotation amount R1 of the first shift register. Then, at the end of the (m+2)th scan, the value of the rotation amount R2 is 3 and thus the printing operation for the (m+3)th and subsequent scans is not performed. At this time the printing operation is ended.

As described above, in this embodiment, the first shift register E3001 is used for the thinning processing in the multi-pass printing and the second shift register E3003 is used for the printing correction at the rear end of the printing medium, with the rotation amounts R1 and R2 of these two registers separated. By managing the thinning processing for the multi-pass printing and the printing medium rear end correction processing with separate algorithms, the printing operation as a whole can be simplified. Further, the print data is rotated by the first shift register E3001 and then combined with the development data to generate the developed print data, which is rotated by the second shift register E3003 before being transferred to the printing head. This unique process obviates the need for rotating the developed data on printing the print medium rear end, thus reducing the processing time.

7. SECOND EMBODIMENT

In the first embodiment a four-pass printing has been described. In this second embodiment a two-pass printing will be explained.

Because the printing is completed in two passes in this embodiment, the distance that the printing medium is fed once is H/2 where H is the height of the printing head. This distance may also be represented as 4h/2=2h if the height of each block of the printing head, h=H/4, is used as in the first embodiment.

In the two-pass printing, there are two thinning patterns which are complementary to each other.

One rotation amount in the first shift register and the second shift register is considered to be H/4 as in the first embodiment.

Figure 14:
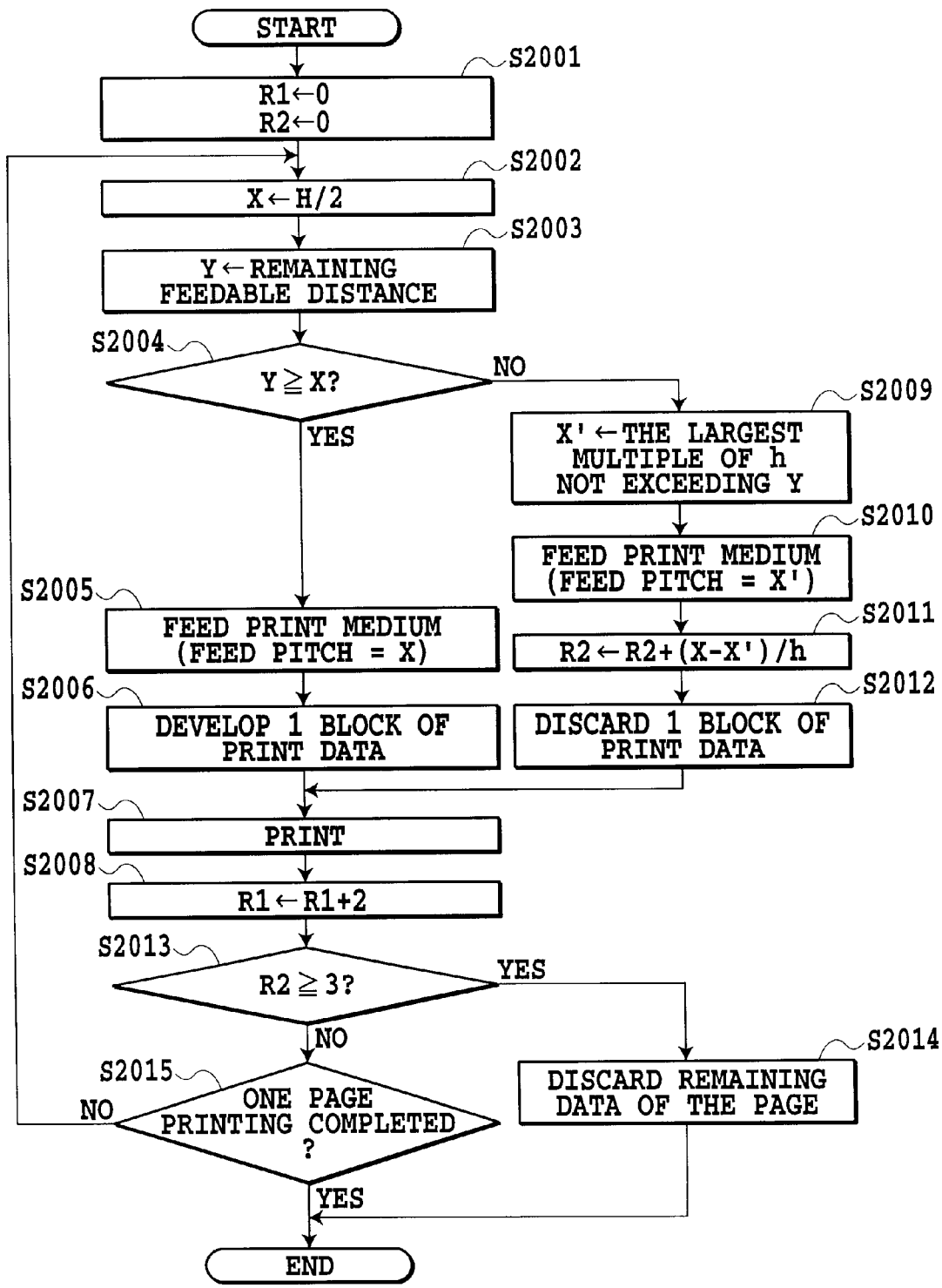
FIG. 14 is a flow chart showing a flow of processing performed by the CPU during the printing operation in the second embodiment.

FIG. 14 is a flow chart showing the processing performed by the CPU E1001 in this embodiment.

As in the first embodiment, the rotation amount R1 of the first shift register and the rotation amount R2 of the second shift register are both cleared to zero (step S2001). Next, according to the two-pass printing, H/2 is substituted into the logical printing medium feed pitch X (step S2002). The remaining feedable distance down to the rear end of the printable area of the printing medium is determined and substituted into Y (step S2003).

The X and Y determined in this way are compared as in the first embodiment (step S2004). If Y is equal to or larger than X, the printing medium can be fed normally. Hence, it is fed by the logical printing medium feed pitch X (step S2005). Then, according to a command received through the external I/F, one block of print data is developed in the print buffer (step S2006), and a rotation amount R1 is set in the print data development DMA controller E2015, and a rotation amount R2 is set in the head control unit E2018 to perform the printing operation (step S2007). After the printing operation of one scan has been completed, the rotation amount R1 for the first shift register is incremented by "2" in preparation for the printing of the next block (step S2008).

When on the other hand the logical printing medium feed pitch X exceeds the remaining feedable distance Y, the largest multiple of the block height h which does not exceed the remaining feedable distance Y is substituted into a physical printing medium feed pitch X', in order to print as close to the rear end of the printable area as possible (step S2009). Then, the printing medium is fed by the physical printing medium feed pitch X' (step S2010). There is, however, a distance that the printing medium has not actually been fed when compared with the logical printing medium feed pitch X. To correct the distance that the printing medium has not actually been fed X–X', R2 is incremented by (X–X')/h (step S2011). Then, one block of print data is discarded (step S2012) and the CPU proceeds to step S2007 executing the processing of the steps 2007 and 2008.

When the value of R2 is 3 or more when the processing has been done up to step S2008, no further printing operation can be executed as in the first embodiment and thus the remaining print data is discarded (step S2014). When the value of R2 is less than 3, it is checked whether the printing of one page has been completed (step S2015). If it is found the printing is not yet completed, the CPU returns to step S2002. If the printing is completed, the processing of one-page printing is ended.

Figure 15:
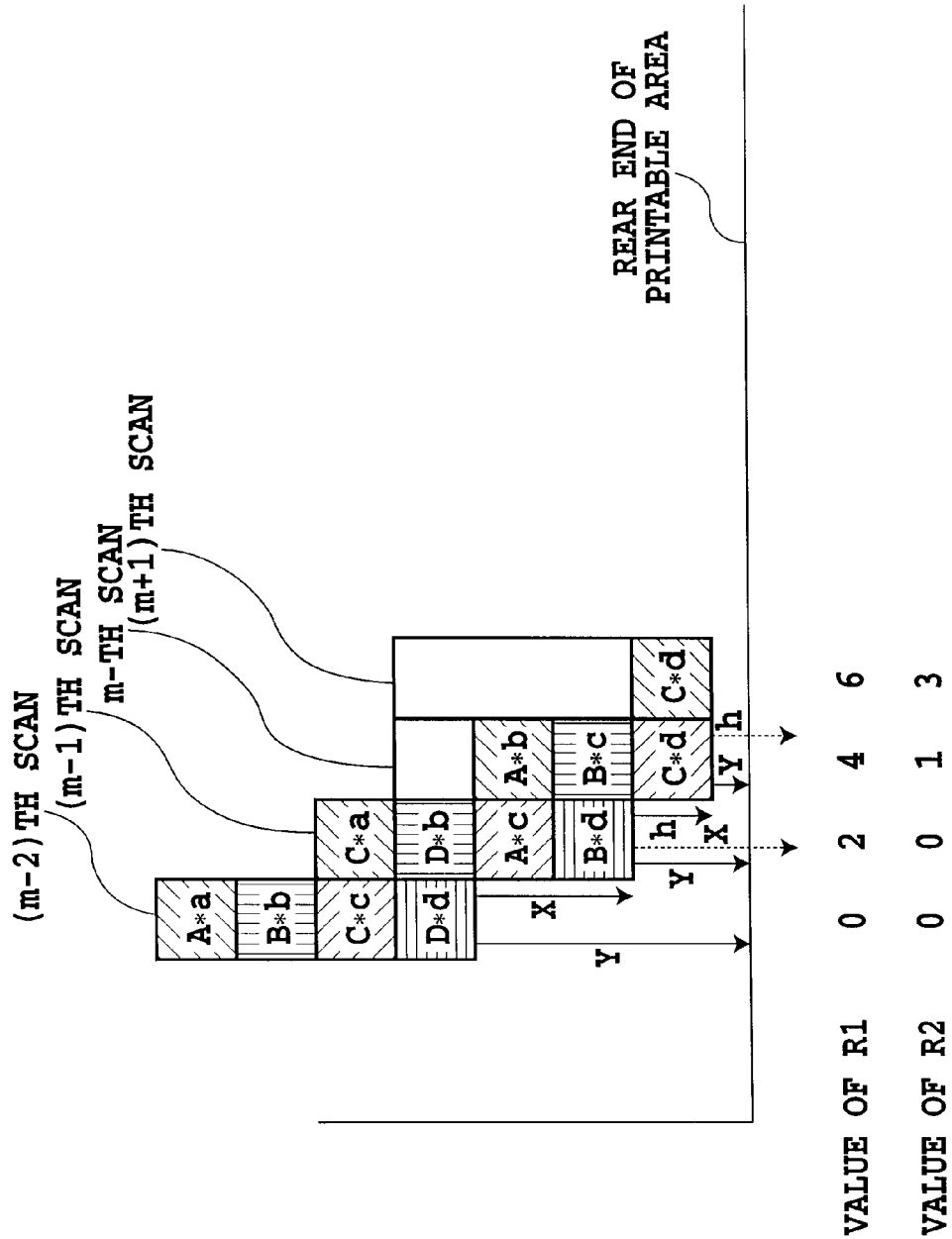
FIG. 15 is a schematic diagram showing how the printing is performed in the second embodiment.

FIG. 15 is a schematic diagram showing how the printing medium is printed in this embodiment.

As in the first embodiment, each of the squares in the figure represents one block of the printing head and the symbol in the square represents a block of the printing medium A, B, C, D and a block of printing head a, b, c, d that scans the corresponding block of the printing medium. Inclined lines in the squares represent thinning patterns. In this embodiment, the printing is done in two passes and therefore there are two thinning patterns that are complementary to each other.

Up to the (m−1)th scan immediately before the printing head reaches the rear end of the printable area of the printing medium, the remaining feedable distance Y is larger than the logical printing medium feed pitch X, so that the print operation is executed by feeding the printing medium a distance of X at a time and incrementing the rotation amount R1 for the first shift register E3001 by 2. When the (m−1)th scan is completed, the printing head comes where the next logical printing medium feed pitch X will exceed the remaining feedable distance Y. So, in the m-th scan, the printing medium is fed by the largest multiple of h within the remaining feedable distance Y (in the figure, h), and the rotation amount R1 for the first shift register E3001 is incremented by 2. Then, the rotation amount R2 for the second shift register E3003 is incremented by "1" because the equation of step S2011 "R2+(X–X')/h" results in "R2+(2h–h)/h=R2+1". Then the printing operation is performed.

In the (m+1)th scan, because the remaining feedable distance Y is smaller than the logical printing medium feed pitch X and is also smaller than the block height h, the printing medium feeding operation is not carried out but the rotation amount R1 for the first shift register E3001 is incremented by 2 and the rotation amount R2 for the second shift register E3003 is set to "3" by adding (2h–0)/h=2 to the previous R2 value of "1" before performing the printing operation.

At this point, because the value of R2 becomes "3", no further printing operation can be done. At the (m+1)th scan the one-page printing operation is ended.

As described above, the first shift register E3001 is used for the processing of the multi-pass printing and the second shift register E3003 is used for the printing medium rear end correction processing. Therefore, if the printing medium feed pitch 2h in the multi-pass printing and the unit correction amount h in the printing medium rear end correction processing differ from each other, this can easily be dealt with because the algorithms for these processing are independent of each other, as in this embodiment. Further, by making the unit correction amount in the printing medium rear end correction processing smaller than the unit feed pitch in the multi-pass printing, the printing can be performed as close to the rear end of the printable area as possible, reducing the blank area left. Thus, the printing can be performed to the fullest extent of the printable area.

An example of the printing head to which the present invention can be effectively applied is one that utilizes thermal energy generated by the electro-thermal transducer to cause film boiling in a liquid and thereby generate a bubble.

The present invention also includes the printing system in which the function in the above embodiments are realized by supplying the software or the program codes of the printer driver for realizing the function in the above embodiments to a computer in a machine or a system connected with various devices with a printing apparatus and by operating various devices through the program codes stored in a computer of a machine or a system.

In this case, the program codes realize the new function of the present invention, therefore the present invention includes the program codes themselves and the means for supplying the program codes stored in the recording medium to a computer.

The recording medium for supplying the above program codes may be, for example, a floppy disk, a hard disk, an optical disk, an optical magnetic disk, a CD-ROM, a CD-R, a magnetic tape, a non-volatile memory card, a ROM, or the like.

The present invention also includes a case in which the functions of the embodiments described above are realized through some or the whole of the actual processings executed not only by a computer which reads and executes the program codes, but also by an OS (Operating System) running on a computer according to the directions of the program codes.

The present invention also includes a case in which the program codes read from the recording medium are written in a memory provided in a function extension board set in a computer or a function extension unit connected to the computer, then the function extension board or the CPU of the function extension unit executes some or the whole processings according to the directions of the program codes, thereby realizing the functions of the embodiments described above.

With the printing apparatus and the printing method according to the present invention, one of the two rotating means is used as a data rotating means for the multi-pass printing and the other is used as a data rotating means for the printing medium rear end correction processing, so that these processing can be executed by separate algorithms. This arrangement also allows the rotation amounts to be determined separately. Hence, in the printing of the rear end part of the printing medium, it is possible to keep the printing within a printable area and correctly complete the multi-pass printing with ease. Further, this arrangement can simplify these processing and obviate the need for rotating the data thinning patterns. This in turn reduces the time required for the processing.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A printing apparatus for forming an image on an entire surface of a printing medium by scanning a printing head being arranged a plurality of printing elements over the printing medium a plurality of times in a direction different from that in which the printing elements are arranged and by moving, between the plurality of scans, the printing medium relative to the printing head in a direction different from that in which the printing head is scanned, the printing apparatus comprising:

a printing medium feeding unit for moving the printing medium a predetermined feed distance relative to the printing head;

a data storing unit for storing image data for one scan of the printing head;

a first rotating unit for reading out the image data stored in the data storing unit and rotating the image data a predetermined number of times, one block of data at a time, the one block representing a predetermined amount of data;

a thinning unit for thinning the image data output from the first rotating unit with a predetermined pattern; and a second rotating unit for reading out the image data thinned by the thinning unit and rotating the image data a predetermined number of times, one block of data at a time, the one block representing a predetermined amount of data.

2. A printing apparatus as claimed in claim 1, further including a remaining feedable distance calculation unit for detecting a rear end of a printable area with respect to the printing medium feeding direction and calculating a distance to the rear end of the printable area, i.e., a remaining feedable distance Y;

wherein a length of the arrangement of the plurality of printing elements in the printing head is denoted as H, a predetermined printing medium feeding pitch of the printing medium feeding unit is denoted as X and the predetermined amount of data in the first and second rotating means is denoted as h;

wherein when the remaining feedable distance Y is equal to or larger than the printing medium feeding pitch X, the printing medium feeding unit feeds the printing medium by the printing medium feeding pitch X and the first rotating unit increases the number of rotations by X/h and rotates the image data accordingly;

wherein when the remaining feedable distance Y is less than the printing medium feeding pitch X, the printing medium feeding unit feeds the printing medium by a maximum multiple X' of h that does not exceed the remaining feedable distance Y, the first rotating unit increases the number of rotations by X/h and rotates the image data accordingly, and the second rotating unit increases the number of rotations by (X−X')/h and rotates the image data accordingly.

3. A printing apparatus as claimed in claim 2, wherein the plurality of times is H/h.

4. A printing apparatus as claimed in claim 2, wherein when the remaining feedable distance Y is less than the printing medium feeding pitch X, the second rotating unit discards one block of the image data.

5. A printing method using a printing apparatus, wherein the printing apparatus forms an image on an entire surface of a printing medium by scanning a printing head being arranged a plurality of printing elements over the printing medium a plurality of times in a direction different from that in which the printing elements are arranged and by moving, between the plurality of scans, the printing medium relative to the printing head in a direction different from that in which the printing head is scanned, the printing method comprising the steps of:

a printing medium feeding step for moving the printing medium a predetermined feed distance relative to the printing head;

a data storing step for storing image data for one scan of the printing head;

a first rotating step for reading out the image data stored in the data storing step and rotating the image data a predetermined number of times, one block of data at a time, the one block representing a predetermined amount of data;

a thinning step for thinning the image data output from the first rotating step with a predetermined pattern; and a second rotating step for reading out the image data thinned in the thinning step and rotating the image data a predetermined number of times, one block of data at a time, the one block representing a predetermined amount of data.

6. A printing method as claimed in claim 5, further including a remaining feedable distance calculation step for detecting a rear end of a printable area with respect to the printing medium feeding direction and calculating a distance to the rear end of the printable area, i.e., a remaining feedable distance Y;

wherein a length of the arrangement of the plurality of printing elements in the printing head is denoted as H, a predetermined printing medium feeding pitch in the printing medium feeding step is denoted as X and the predetermined amount of data in the first and second rotating step is denoted as h;

wherein when the remaining feedable distance Y is equal to or larger than the printing medium feeding pitch X, the printing medium feeding step feeds the printing medium by the printing medium feeding pitch X and the first rotating step increases the number of rotations by X/h and rotates the image data accordingly;

wherein when the remaining feedable distance Y is less than the printing medium feeding pitch X, the printing medium feeding step feeds the printing medium by a maximum multiple X' of h that does not exceed the remaining feedable distance Y, the first rotating step increases the number of rotations by X/h and rotates the image data accordingly, and the second rotating step increases the number of rotations by (X−X')/h and rotates the image data accordingly.

7. A printing method as claimed in claim 6, wherein the plurality of times is H/h.

8. A printing method as claimed in claim 6, wherein when the remaining feedable distance Y is less than the printing medium feeding pitch X, the second rotating step discards one block of the image data.

9. A data processing method for a printing apparatus, wherein the printing apparatus forms an image on an entire surface of a printing medium by scanning a printing head being arranged a plurality of printing elements over the printing medium a plurality of times in a direction different from that in which the printing elements are arranged and by moving, between the plurality of scans, the printing medium relative to the printing head in a direction different from that in which the printing head is scanned, the method comprising the steps of:

a first rotating step for rotating the image data for one scan of the print head a predetermined number of times, one block of data at a time, the one block representing a predetermined amount of data;

a thinning step for thinning the image data output from the first rotating step with a predetermined pattern; and a second rotating step for reading out the image data thinned in the thinning step and rotating the image data a predetermined number of times, one block of data at a time, the one block representing a predetermined amount of data.

10. A program for performing a control method of a printing apparatus by means of a computer, wherein the printing apparatus forms an image on an entire surface of a printing medium by scanning a printing head being arranged a plurality of printing elements over the printing medium a plurality of times in a direction different from that in which the printing elements are arranged and by moving, between the plurality of scans, the printing medium relative to the printing head in a direction different from that in which the printing head is scanned, the method comprising the steps of:

a first rotating step for rotating image data for one scan of the print head a predetermined number of times, one block of data at a time, the one block representing a predetermined amount of data;

a thinning step for thinning the image data output from the first rotating step with a predetermined pattern; and a second rotating step for reading out the image data thinned in the thinning step and rotating the image data a predetermined number of times, one block of data at a time, the one block representing a predetermined amount of data.

* * * * *